United States Patent
Fujiwara et al.

(10) Patent No.: US 9,701,095 B2
(45) Date of Patent: Jul. 11, 2017

(54) BULKY NONWOVEN FABRIC

(75) Inventors: Toshikatsu Fujiwara, Shiga (JP); Hirokazu Terada, Shiga (JP)

(73) Assignees: JNC CORPORATION, Tokyo (JP); JNC FIBERS CORPORATION, Tokyo (JP)

( * ) Notice: Subject to any disclaimer, the term of this patent is extended or adjusted under 35 U.S.C. 154(b) by 1298 days.

(21) Appl. No.: 13/085,023

(22) Filed: Apr. 12, 2011

(65) Prior Publication Data
US 2011/0250816 A1    Oct. 13, 2011

(30) Foreign Application Priority Data

Apr. 13, 2010  (JP) ................................. 2010-092576
Mar. 22, 2011  (JP) ................................. 2011-062498

(51) Int. Cl.
*B32B 5/26*     (2006.01)
*B32B 27/02*    (2006.01)
(Continued)

(52) U.S. Cl.
CPC ................ *B32B 5/26* (2013.01); *B32B 5/022* (2013.01); *B32B 5/06* (2013.01); *B32B 5/08* (2013.01); *B32B 27/02* (2013.01); *B32B 27/12* (2013.01); *B32B 27/32* (2013.01); *D04H 1/06* (2013.01); *D04H 1/4374* (2013.01); *D04H 1/4382* (2013.01); *D04H 1/4391* (2013.01); *D04H 1/50* (2013.01); *D04H 1/541* (2013.01); *D04H 1/544* (2013.01); *D04H 1/559* (2013.01);
(Continued)

(58) Field of Classification Search
USPC ..... 442/352, 358, 394, 403; 264/168, 171.1; 428/36.1, 36.2, 181; 156/308.2
See application file for complete search history.

(56) References Cited

U.S. PATENT DOCUMENTS

| | | | |
|---|---|---|---|
| 7,955,455 B2* | 6/2011 | Hanson et al. | ............... 156/62.2 |
| 2002/0068150 A1 | 6/2002 | Taneichi et al. | |
| 2003/0143376 A1 | 7/2003 | Toyoshima et al. | |

FOREIGN PATENT DOCUMENTS

| | | |
|---|---|---|
| EP | 1 323 400 | 7/2003 |
| JP | 2005-15964 | 1/2005 |
| JP | 2005-314825 | 11/2005 |

OTHER PUBLICATIONS

European Search Report (in English language) issued Aug. 2, 2011 in corresponding European Patent Application No. 11 16 2033.

* cited by examiner

*Primary Examiner* — Lynda Salvatore
(74) *Attorney, Agent, or Firm* — Wenderoth, Lind & Ponack, L.L.P.

(57) ABSTRACT

The invention provides a nonwoven fabric which can improve these problems of the conventional technologies, can be produced at relatively low costs, is bulky and excellent in cushioning properties, has a good texture and is excellent in shaping ability at post-processing. Specifically, the present invention provides a bulky nonwoven fabric, comprising a fiber layer A containing a spiral crimp fiber and a fiber layer B, wherein the fiber layer B is laminated on at least one surface of the fiber layer A, the spiral crimp fiber of the fiber layer A and the fiber of the fiber layer B are partly entangled and integrated at the interface in a thickness direction of both layers, the fiber layer B exhibits a structure in which the layer is lifted up to the fiber layer B side between individual entangled parts; and having a specific volume of 30 cm³/g or more.

17 Claims, 4 Drawing Sheets

(51) Int. Cl.
*B32B 27/12* (2006.01)
*B32B 27/32* (2006.01)
*D04H 1/06* (2012.01)
*D04H 1/50* (2012.01)
*D04H 1/4374* (2012.01)
*D04H 1/4382* (2012.01)
*D04H 1/4391* (2012.01)
*D04H 1/559* (2012.01)
*D04H 3/018* (2012.01)
*D04H 1/541* (2012.01)
*D04H 1/544* (2012.01)
*B32B 5/02* (2006.01)
*B32B 5/06* (2006.01)
*B32B 5/08* (2006.01)

(52) U.S. Cl.
CPC ...... *D04H 3/018* (2013.01); *B32B 2262/0253* (2013.01); *B32B 2262/0276* (2013.01); *B32B 2262/12* (2013.01); *B32B 2307/546* (2013.01); *B32B 2307/732* (2013.01); *Y10T 442/627* (2015.04); *Y10T 442/634* (2015.04); *Y10T 442/635* (2015.04)

BULKY NONWOVEN FABRIC

BACKGROUND OF THE INVENTION

1. Field of the Invention

The present invention relates to a bulky nonwoven fabric, a product using the bulky nonwoven fabric, and a process for producing the bulky nonwoven fabric.

2. Brief Description of the Background Art

Since common spunbond nonwoven fabrics and thermal bond nonwoven fabrics are inexpensive, they are widely used as convenient and common nonwoven fabrics. However, since fibers in a nonwoven fabric are not arranged in the thickness direction due to a production process, the obtained nonwoven fabric is inferior in bulkiness, cushioning properties and pleasant feel. In order to solve these problems, the bulky nonwoven fabric of the invention utilizes a difference in shrinkage between fibers. Examples of known nonwoven fabrics utilizing the difference in shrinkage between fibers are disclosed in the following Patent Literatures.

Patent Literature 1 discloses a nonwoven fabric wherein a non-shrinkable fiber web and a shrinkable monocomponent fiber web are partly thermally press-bonded and then heat-shrunk to form regular convex parts.

Patent Literature 2 discloses a nonwoven fabric wherein a non-shrinkable fiber web and a shrinkable monocomponent fiber web are partly subjected to needle punch entanglement or high-pressure hydroentanglement and then heat-shrunk to form a large number of rib-like convex parts.

Patent Literature 3 discloses a nonwoven fabric wherein a non-shrinkable fiber layer and a shrinkable fiber layer are substantially partly thermally press-bonded and then heat-shrunk and thereby parts which are not thermally press-bonded are protruded to form a large number of convex parts.

Patent Literature 4 discloses a nonwoven fabric wherein a non-shrinkable fiber layer and a shrinkable fiber layer are partly thermally press-bonded and then heat-shrunk and thereby parts which are not thermally press-bonded form a large number of convex parts.

CITATION LIST

Patent Literature

Patent Literature 1: JP-A-9-3755
Patent Literature 2: JP-A-10-114004
Patent Literature 3: JP-A-2004-202890
Patent Literature 4: JP-A-2006-45724

SUMMARY OF THE INVENTION

However, these conventional technologies have the following disadvantageous points. For example, since the nonwoven fabric described in Patent Literature 1 uses a shrinkable monocomponent fiber web, there is a problem that the shrinkable monocomponent fiber after shrinking does not exhibit spiral crimps, and mechanical crimps are fully stretched, thereby bulkiness of the shrinkable monocomponent fiber web layer extremely lowers, and flexibility of the web decreases. Moreover, since a step of thermal pressing treatment is necessarily required prior to the heat-shrinking step, there is a problem that facility costs and energy costs are relatively high.

The nonwoven fabric described in Patent Literature 2 has a problem that the nonwoven fabric cannot be produced at low costs since the needle punch entanglement or the high-pressure hydroentanglement is required in a previous step; and the needle punch entanglement is low in production rate; and the high-pressure hydroentanglement is high in energy cost.

The nonwoven fabric described in Patent Literature 3 is similar to the nonwoven fabric described in Patent Literature 1 but it necessarily requires a step of thermal pressing treatment prior to a heat-shrinking step. Accordingly, there is a problem that facility costs and energy costs are relatively high as in the case of the nonwoven fabric described in Patent Literature 1.

Since the nonwoven fabric described in Patent Literature 4 also necessarily requires a step of thermal pressing treatment prior to a heat-shrinking step, there is a problem that facility costs and energy costs are relatively high as in the case of the nonwoven fabrics described in Patent Literatures 1 and 3.

Moreover, the step of thermal press-bonding of a web as described in Patent Literatures 1, 3, and 4 should be a step of thermal press-bonding at a relatively low temperature for a relatively short time in order to suppress shrinkage during the step. In addition, in order to facilitate the shrinking action in a later step, it is necessary to relatively widen the distance between regions to be thermal press-bonded. Therefore, this leads decrease in productivity since the web tends to twine around an engraved roll or a flat roll.

Based on the above, an object of the invention is to provide a nonwoven fabric which can improve these problems of the conventional technologies, can be produced at relatively low costs, is bulky and excellent in cushioning properties, has a good texture, and is excellent in shaping ability at post-processing.

The bulky nonwoven fabric of the invention is obtained by laminating a web layer comprising latent crimpable fibers capable of exhibiting spiral crimps as a lower layer and a non-shrinkable web layer as an upper layer; and then heating the laminate, thereby carrying out the shrinking of the lower layer and the formation of a nonwoven fabric at the same time. The lower layer and the upper layer after carrying out the shrinking and the formation of a nonwoven fabric are defined as a fiber layer A and a fiber layer B, respectively.

The obtained bulky nonwoven fabric of the invention is a bulky nonwoven fabric, comprising a fiber layer A containing a spiral crimp fiber and a fiber layer B wherein the fiber layer B is laminated on at least one surface of the fiber layer A, the spiral crimp fiber of the fiber layer A and the fiber of the fiber layer B are partly entangled and integrated at an interface in the thickness direction of both layers, the fiber layer B exhibits a structure in which the layer is lifted up to the fiber layer B side between individual entangled parts; and having a specific volume of 30 $cm^3/g$ or more. Thereby, the above object can be accomplished.

Since the bulky nonwoven fabric of the invention has a structure in which the fiber layer B is lifted up to the fiber layer B side between the entangled parts of the fiber layer A and the fiber layer B, the nonwoven fabric is excellent in bulkiness and also excellent in cushioning properties in the thickness direction. Moreover, the density of the fiber layer A is higher than that of the fiber layer B and the nonwoven fabric is excellent in pleasant feel at the surface of the fiber layer B side.

Moreover, in the bulky nonwoven fabric of the invention, since fibers are arranged in the thickness direction in the fiber layer B as compared with the conventional carded nonwoven fabric, even in the case of press-shaping or thermal press-shaping by means of a mold, a decrease in bulkiness at uncompressed parts is small and thus the present nonwoven fabric is more excellent in designing properties.

Furthermore, the bulky nonwoven fabric of the invention has an advantage that it can be produced at relatively low costs by using common nonwoven fabric-producing facilities since the nonwoven fabric can be prepared by heating fibers using two carding machines.

REFERENCE SIGNS LIST

Figure 1:
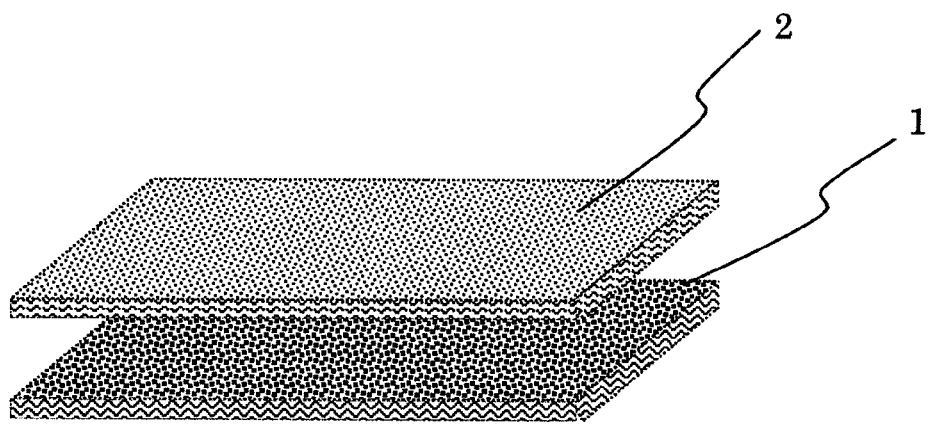
FIG. 1 is a schematic view of the fiber layer A and the fiber layer B before lamination and before thermal treatment.

1 "Fiber layer A" before thermal treatment
2 "Fiber layer B" before thermal treatment
1' "Fiber layer A" after thermal treatment
2' "Fiber layer B" after thermal treatment
3 Cross-section of contact surface part of "fiber layer A" and "fiber layer B" after thermal treatment
4 Developed spiral crimp fiber
5 Fiber of "fiber layer B"

DETAILED DESCRIPTION OF THE INVENTION

The present invention relates to the following (1) to (15):
(1) A bulky nonwoven fabric, comprising a fiber layer A containing a spiral crimp fiber and a fiber layer B, wherein the fiber layer B is laminated on at least one surface of the fiber layer A, the spiral crimp fiber of the fiber layer A and the fiber of the fiber layer B are partly entangled and integrated at the interface in a thickness direction of both layers, the fiber layer B exhibits a structure in which the layer is lifted up to the fiber layer B side between individual entangled parts; and having a specific volume of 30 cm$^3$/g or more;
(2) The bulky nonwoven fabric described in the above (1), wherein the spiral crimp fiber contained in the fiber layer A is a fiber obtained by allowing a latent crimpable fiber to exhibit a spiral crimp and, at the time of exhibiting the spiral crimp of the latent crimpable fiber, the spiral crimp fiber of the fiber layer A and the fiber of the fiber layer B are entangled and integrated at the interface of both fiber layers;
(3) The bulky nonwoven fabric described in the above (1) or (2), wherein the latent crimpable fiber contained in the fiber layer A is a latent crimpable heat-fusible conjugate fiber and the entangled points at the entangled part of the spiral crimped fiber of the fiber layer A and the fiber of the fiber layer B are bonded to each other by at least heat-fusion of the latent crimpable heat-fusible conjugate fiber;
(4) The bulky nonwoven fabric described in any one of the above (1) to (3), wherein the fiber layer B is pressed with a mold on which a shaping pattern is engraved;
(5) The bulky nonwoven fabric described in any one of the above (1) to (3), wherein the fiber layer B is pressed with a hot emboss roll to be press-fused;
(6) The bulky nonwoven fabric described in the above (5), wherein one fused region press-fused has an area of 0.1 mm$^2$ or more to 4.0 mm$^2$ or less; the fused region and an adjacent fused region has the shortest distance of 2.0 mm or more; and the fused regions has an area percentage of 2% or more to 25% or less to the area of the whole nonwoven fabric;
(7) The bulky nonwoven fabric described in any one of the above (1) to (5), wherein the spiral crimp fiber contained in the fiber layer A is a conjugate fiber having a side-by-side type and/or eccentric sheath-core type cross-section which is composed of an ethylene-propylene random copolymer and/or an ethylene-propylene-butene-1 random copolymer and polypropylene;
(8) The bulky nonwoven fabric described in the above (7), wherein the random copolymer and the polypropylene are contained in a conjugate ratio of 30/70 to 70/30 on the basis of weight;
(9) The bulky nonwoven fabric described in any one of the above (1) to (8), wherein the fiber layer B is a layer which contains a heat-fusible conjugate fiber comprising two components and has at least one cross-section structure selected from a sheath-core type one, an eccentric sheath-core type one and a side-by-side type one;
(10) The bulky nonwoven fabric described in the above (9), wherein the two components are contained in a conjugate ratio of 30/70 to 70/30 on the basis of weight;
(11) The bulky nonwoven fabric described in any one of the above (1) to (10), wherein the fiber constituting the fiber layer A has a fineness of 1.5 dtex or more to 17.6 dtex or less and a real fiber length of 30 mm or more to 128 mm or less;
(12) The bulky nonwoven fabric described in any one of the above (1) to (11), wherein the fineness of the fiber constituting the fiber layer B is 1.5 dtex or more to 6.7 dtex or less and the real fiber length thereof is in the range of 30 mm or more to 102 mm or more;
(13) A product comprising the bulky nonwoven fabric described in any one of the above (1) to (12);
(14) A process for producing a bulky nonwoven fabric, comprising laminating, on at least one surface of a fiber layer A containing a latent crimpable fiber, a fiber layer B which is spirally crimped weaker than the fiber layer A or is not spirally crimped at a temperature that the fiber layer A is spirally crimped; subjecting the resulting laminate to a thermal treatment, thereby partly entangling the spiral crimp fiber of the fiber layer A and the fiber of the fiber layer B to form entangled parts at the interface in a thickness direction of both layers; and lifting up the fiber layer B to the fiber layer B side between individual entangled parts;
(15) The process described in the above (14), wherein the latent crimpable fiber contained in the fiber layer A is a latent crimpable conjugate fiber and, upon the exhibition of the spiral crimp of the latent crimpable fiber by the thermal treatment, the spiral crimp fiber of the fiber layer A and the fiber of the fiber layer B are partly entangled at the interface in the thickness direction of both layers and integrated; and
(16) The process described in the above (15), wherein the latent crimpable conjugate fiber contained in the fiber layer A is a latent crimpable heat-fusible conjugate fiber and the entangled points at the entangled parts of the spiral crimp fiber of the fiber layer A and the fiber of the fiber layer B are bonded to each other by at least heat-fusion of the latent crimpable heat-fusible conjugate fiber.

Figure 2:
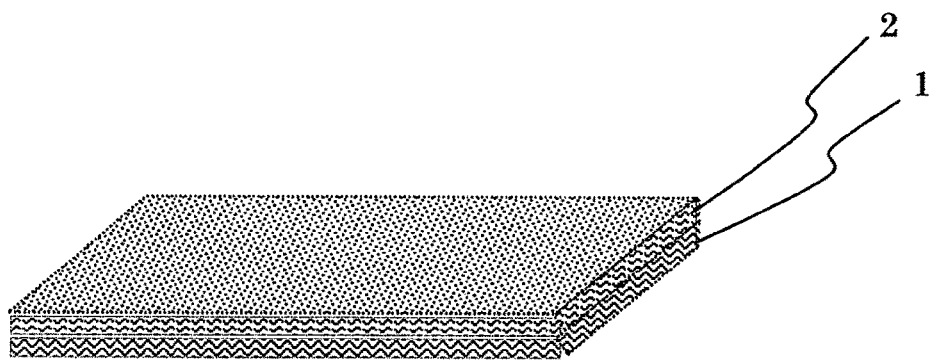
FIG. 2 is a schematic view of the fiber layer A and the fiber layer B after lamination and before thermal treatment.

FIG. 1 is a schematic view of individual layers of the fiber layer A and the fiber layer B constituting the bulky nonwoven fabric of the invention before lamination and thermal treatment of the layers. FIG. 2 is a schematic view of a laminate of the fiber layer A and the fiber layer B constituting the bulky nonwoven fabric of the invention before thermal treatment. In FIGS. 1 and 2, 1 is a fiber layer A before thermal treatment and 2 is a fiber layer B before thermal treatment.

Figure 3:
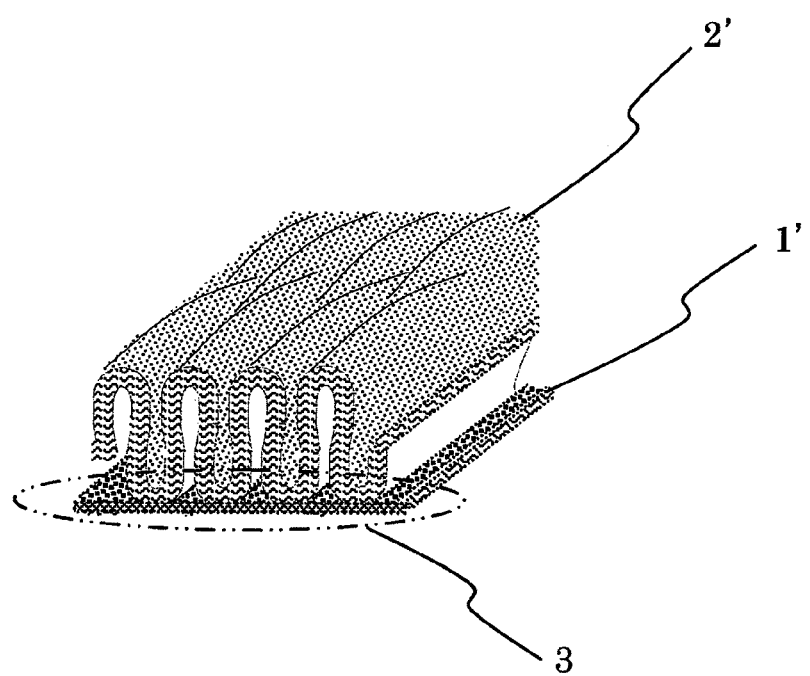
FIG. 3 is one example of the schematic views of the fiber layer A and the fiber layer B after lamination and after thermal treatment.
Figure 4:
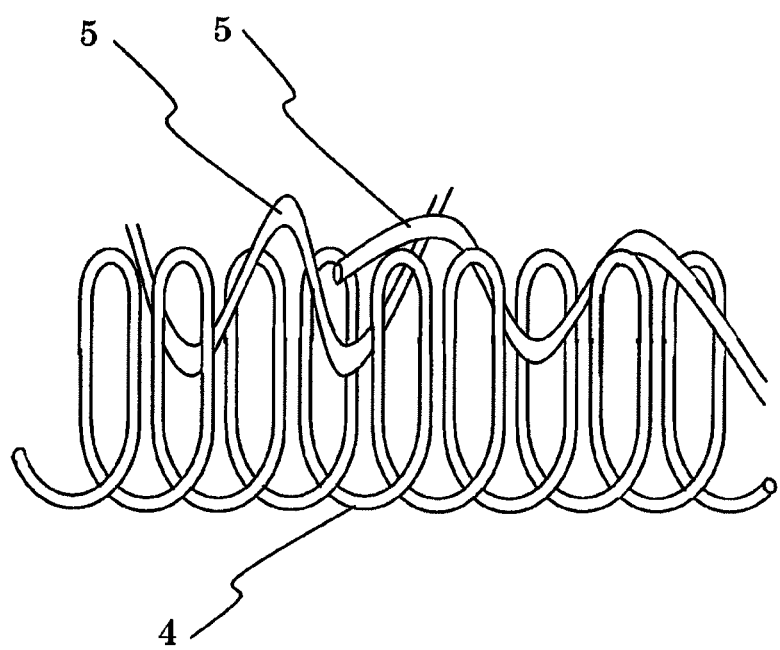
FIG. 4 is one example of the schematic views of an entangled state where the fiber of the fiber layer B is twined around the spiral crimp fiber of the fiber layer A.

FIG. 3 is one example of the schematic views of a laminate of the fiber layer A and the fiber layer B after thermal treatment. In FIG. 3, 1' is a fiber layer A after thermal treatment and 2' is a fiber layer B after thermal treatment, and 3 is a schematic view of an MD cross-section of the contact surface part of the fiber layer A and the fiber layer B after lamination and thermal treatment. FIG. 4 is one example of the schematic views of an entangled state of the fiber of the "fiber layer B" and the spiral crimp fiber of the fiber layer A. In FIG. 4, 4 is a developed spiral crimp fiber of the fiber layer A and 5 is a fiber of the fiber layer B. In addition, MD means a direction that such as a manufactured fiber layer or nonwoven fabric flows in its production process (runs through a process line), namely the direction pallalel to the length of the fiber layer or the nonwoven fabric. MD is an abbreviation of "Machine Direction". On the other hand, CD means a direction perpendicular to the above MD, namely the direction pallalel to the width of the fiber layer or the nonwoven fabric. CD is an abbreviation of "Cross Direction."

[Fiber Layer A]

The "spiral crimp fiber" contained in the fiber layer A refers to a spirally crimped fiber. The "spirally crimped" represents a state that the top part of the crimp is spirally curved. The fiber constituting the fiber layer A is not particularly limited in the content of the spiral crimp fiber as long as the fiber necessarily contains the spiral crimp fiber and the shrinking ratio of the web corresponding to a fiber layer A before transformed into the fiber layer A is 50% or more. Moreover, as a fiber other than the spiral crimp fiber, a zigzag crimp fiber or a U-shaped crimp fiber may be contained.

The spiral crimp fiber contained in the fiber layer A is preferably a conjugate fiber having a side-by-side type and/or eccentric sheath-core type cross-section which is composed of an ethylene-propylene random copolymer and/or an ethylene-propylene-butene-1 random copolymer and polypropylene. The above conjugate fiber is preferred for the purpose of imparting shrinking ability to the web before transformation of the fiber A into a bulky nonwoven fabric by a potential ability of the conjugate fiber to crimp.

The conjugate ratio of the random copolymer to polypropylene is preferably in the range of 30/70 to 70/30, more preferably 35/65 to 65/35 on the basis of weight. By setting the ratio of the random copolymer to polypropylene to 30% or more on the basis of weight, the web before the transformation of the fiber A into a bulky nonwoven fabric can exhibit shrinking ability. Moreover, by setting the ratio of the random copolymer as polypropylene to 70% or less on the basis of weight, hardening of the bulky nonwoven fabric along with an increase in fused components can be prevented.

The spiral crimp fiber constituting the fiber layer A preferably contains a fiber obtained by exhibiting spiral crimps on the latent crimpable fiber. The latent crimpable fiber is preferably a latent crimpable conjugate fiber, more preferably a latent crimpable heat-fusible conjugate fiber. However, all the spiral crimp fiber contained in the fiber layer A may not be the fiber obtained by exhibiting spiral crimps on the latent crimpable conjugate fiber.

The "latent crimpable conjugate fiber" is a conjugate fiber which exhibits spiral crimps by heating and a fiber composed of two or more components where a resin other than a resin having the highest melting point may be or may not be exposed on at least a part of the fiber surface.

The "latent crimpable heat-fusible conjugate fiber" is a conjugate fiber exhibiting spiral crimps by heating and a fiber composed of two or more components where a resin other than a resin having the highest melting point is exposed on at least a part of the fiber surface.

In general, since the latent crimpable heat-fusible conjugate fiber utilizes thermal energy for exhibiting spiral crimps, the conjugate fiber does not have so excellent heat fusibility but exhibits heat fusibility by performing a thermal treatment at a temperature higher than the melting point and for a relatively long time.

The latent crimpable conjugate fiber and the latent crimpable heat-fusible conjugate fiber are preferably constituted by two components for economical reasons.

Examples of the latent crimpable conjugate fiber include a conjugate fiber having an eccentric sheath-core type cross-section composed of an ethylene-propylene random copolymer and/or an ethylene-propylene-butene-1 random copolymer and polypropylene, a conjugate fiber having an eccentric sheath-core type cross-section composed of linear low-density polyethylene and polypropylene, a conjugate fiber having an eccentric sheath-core type cross-section composed of a polyester-based copolymer and polyethylene terephthalate, and a conjugate fiber having an eccentric sheath-core type cross-section composed of polylactic acid and polyethylene terephthalate.

Examples of the latent crimpable heat-fusible conjugate fiber include a conjugate fiber having a side-by-side type and/or eccentric sheath-core type cross-section composed of an ethylene-propylene random copolymer and/or an ethylene-propylene-butene-1 random copolymer and polypropylene, a conjugate fiber having a side-by-side type and/or eccentric sheath-core type cross-section composed of linear low-density polyethylene and polypropylene, a conjugate fiber having a side-by-side type and/or eccentric sheath-core type cross-section composed of a polyester-based copolymer and polyethylene terephthalate, and a conjugate fiber having a side-by-side type and/or eccentric sheath-core type cross-section composed of polylactic acid and polyethylene terephthalate.

Examples of the fiber having no latent crimpability other than fibers after the latent crimpable conjugate fiber and/or latent crimpable heat-fusible conjugate fiber contained in the fiber layer A exhibites spiral crimps include various rayons, various cottons, various linens, kenaf fibers, various water-absorbing fibers, various polyethylene fibers and various polypropylene fibers, various polyester fibers, various Nylon fibers, and various conjugate fibers.

The cross-section of the various conjugate fibers other than the latent crimpable fiber may be any one selected from the group consisting of side-by-side type one, eccentric sheath-core type one and sheath-core type one, and a mixture thereof. Moreover, crimping of these conjugate fibers may be any one selected from the group consisting of a zigzag type one, a spiral type one and a U-shaped one, and a mixture thereof.

The fineness of the fiber constituting the fiber layer A is preferably 1.5 dtex or more to 17.6 dtex or less, more preferably 1.7 dtex or more to 16 dtex or less. By controlling the fineness of the fiber constituting the fiber layer A to 1.5 dtex or more, a decrease in quality of the bulky nonwoven fabric caused by the formation of fiber clots which are generated by excessive entangling of fibers can be prevented. Moreover, by controlling the fineness of the fiber constituting the fiber layer A to 17.6 dtex or less, a decrease in pleasant feel can be prevented.

The fineness of a fiber can be obtained by measuring the diameter of the fiber on an electron microscope or an optical microscope, then measuring the density of the fiber using a density gradient tube or a balance for measuring a density and then calculating using a formula: [diameter $(\mu m)]^2 \div 4 \times \pi \times$[density $(g/cm^3)] \div 100$=[fineness (dtex)]. Moreover, the fineness can be also calculated from a formula: $10000 \times$ [weight of the fiber of L (m)]$\div$L(m)=[fineness (dtex)], using JIS L 0104, and the measurement can be performed by a conventionally known method.

The real fiber length of the fiber constituting the fiber layer A is preferably 30 mm or more to 128 mm or less, more preferably 35 mm or more to 102 mm ore less. By controlling the real fiber length of the fiber constituting the fiber layer A to 30 mm or more, the web can be prevented from being easily disintegrated at the production of the bulky nonwoven fabric. Also, by controlling the real fiber length of the fiber constituting the fiber layer A to 128 mm or less, a decrease in quality of the bulky nonwoven fabric resulting from the formation of fiber clots due to excessive entangling of the fibers can be prevented.

The "real fiber length of the fiber" is a real length of the fiber having crimps and corresponds a length at the time when the crimps are stretched without applying stress to the fiber. The real fiber length of the fiber can be determined by measuring length of one fiber from one end to another end along the fiber using a commercially available apparatus, e.g., a microscope having an image-analyzing function such as a digital microscope manufactured by Keyence Corporation.

The unit weight of the fiber layer A is preferably 12 to 60 $g/m^2$, more preferably 15 to 50 $g/m^2$. By controlling the unit weight to the range, the bulky nonwoven fabric can be made relatively inexpensive and thus becomes suitable for utilization in filter applications such as ventilation fan filters, oil catchers, air filters, oil filters, and electret filters, cleaning sheet applications for floor mops, female material applications of disposable Hook- and Loop fasteners, hygienic material applications such as surface materials for paper diapers and sanitary napkins.

[Fiber Layer B]

Examples of the fiber constituting the fiber layer B include various rayons, various cottons, various linens, kenaf fibers, various water-absorbing fibers, various polyethylene fibers and various polypropylene fibers, various polyester fibers, various nylon fibers, and various conjugate fibers.

The cross-section of the various conjugate fibers may be any one selected from the group consisting of a side-by-side type one, an eccentric sheath-core type one and a sheath-core type one as long as it have less latent crimpability than the fiber layer A, and a mixture thereof may be also used. Moreover, crimping of these conjugate fibers may be any one selected from a zigzag type one, a spiral type one and a U-shaped one, and a mixture thereof.

In order to prevent from dropout of fibers from the fiber layer B, a heat-fusible conjugate fiber is preferably contained in the fiber layer B but the layer may be a blend with a mono-component fiber of a low-melting point. The blending ratio of the thermally fusible conjugate fiber or the low-melting mono-component fiber in the fiber layer B is preferably 30% or more to 10% or less in terms of weight ratio although a demand regarding the dropout of fibers varies depending on applications.

As a form of the layer corresponding to a fiber layer B before transformation into the fiber layer B, various webs and various nonwoven fabrics can be used.

Examples of the webs include fleeces before transformation into nonwoven fabric by a carding method, an air-laid method, a paper-making method, and a spunbond method.

Examples of the nonwoven fabric include point bond nonwoven fabrics, air-through nonwoven fabrics, spun lace nonwoven fabrics, and spunbond nonwoven fabrics.

By using the above-described nonwoven fabric as the fiber layer B, a structure that the fiber layer B is partly lifted up is exhibited on the exposed surface of the fiber layer B. Moreover, in the case where such a nonwoven fabric is used as the fiber layer B, in order to form a relatively dense lifted up structure, flexibility is required for these nonwoven fabrics, and enhancement of an anchoring effect between the fiber layer A and the fiber layer B is also effective. Therefore, for the purpose of forming a relatively dense lifted up structure, it is preferred to cause fuzz on the surface of the fiber layer A side of the nonwoven fabric which is used as the fiber layer B in advance.

The fineness of the fiber constituting the fiber layer B is preferably 1.5 dtex or more to 6.7 dtex or less, more preferably 1.7 dtex or more to 6.0 dtex or less. By controlling the fineness of the fiber constituting the fiber layer A to 1.5 dtex or more, a decrease in quality of the bulky nonwoven fabric caused by the formation of fiber clots which are generated by excessive entangling of fibers can be prevented. Moreover, by controlling the fineness of the fiber constituting the fiber layer A to 6.7 dtex or less, a decrease in pleasant feel can be prevented.

The real fiber length of the fiber constituting the fiber layer B is preferably 30 mm or more to 102 mm or less, more preferably 35 mm or more to 102 mm or less. By controlling the real fiber length of the fiber constituting the fiber layer A to 30 mm or more, the web can be prevented from being easily disintegrated at the production of the bulky nonwoven fabric. Also, by controlling the real fiber length of the fiber constituting the fiber layer A to 102 mm or less, a decrease in quality of the bulky nonwoven fabric caused by the formation of fiber clots which are generated by excessive entangling of fibers can be prevented.

The unit weight of the fiber layer B is preferably 12 to 60 $g/m^2$, more preferably 15 to 50 $g/m^2$. By controlling the unit weight to the range, the bulky nonwoven fabric can be made relatively inexpensive and thus becomes suitable for utilization in filter applications such as ventilation fan filters, oil catchers, air filters, oil filters, and electret filters, cleaning sheet applications for floor mops, female material applications of disposable Hook- and Loop fasteners, hygienic material applications such as surface materials for paper diapers and sanitary napkins.

As shown in FIG. 4, in the bulky nonwoven fabric of the invention, the fiber layer B is laminated on at least one surface of the fiber layer A containing a spiral crimped fiber, and the spiral crimp fiber of the fiber layer A and the fiber of the fiber layer B are partly entangled and integrated at the interface in the thickness direction of both layers. The "partly entangled at the interface in the thickness direction of both layers" refers to a state that the fibers are partly entangled at the interface where the fiber layer A and the fiber layer B is in contact and the fibers are not thermally pressed or compressed. The "entanglement" refers to a state that the spiral crimp fiber of the fiber layer A and the fiber of the fiber layer B are intertwined with each other. The spiral crimp fiber of the fiber layer A and the fiber of the fiber layer B are entangled only at the interface.

The entanglement of the fiber layer A and the fiber of the fiber layer B is formed at the contact surfaces between both layers. In the entangled parts between the spiral crimp fiber of the fiber layer A and the fiber of the fiber layer B, the entangled points are preferably bonded to each other by heat-fusion of at least the latent crimpable heat-fusible conjugate fiber contained in the fiber layer A.

The lamination and integration of the fiber layer A and the fiber layer B may be achieved through bonding by an anchoring effect between the layers or heat-fusion at a part or most part of contact points (or contact surfaces) between the layers, although it varies depending on the fiber species used in the fiber layer A and the fiber layer B. In view of preventing delamination, it is preferred that the layers are bonded by an anchoring effect between the layers and also bonded by heat-fusion at a part or most part of contact points (or contact surfaces) between the layers.

The structure of the lamination and integration of the fiber layer A and the fiber layer B in the bulky nonwoven fabric of the invention is different from the structure where a non-shrinkable fiber web and a shrinkable monocomponent fiber web are partly thermo-compression bonded by an emboss roll (having a regular engraved pattern) to integrate and join, as described in Patent Literature 1.

The bulky nonwoven fabric of the invention exhibits a structure that the fiber layer B is irregularly lifted up to the fiber layer B side between individual entangled parts. In addition, in some case, the lifted up parts exhibit an irregular pleat-like structure which is folded in the MD direction of the nonwoven fabric. The "pleat-like structure" is a structure that a portion having a high fiber density is folded in a pleat-like form mostly in the MD, as shown in the schematic view of FIG. 3. The pleat-like structure is formed on the fiber layer B side at the interface of the fiber layer A and the fiber layer B. In the case where the unit weight of the fiber layer B is sufficiently small, the shape is also exhibited on the surface of the fiber layer B. In FIG. 3, the shape is depicted as a regular pleat-like structure for easy drawing but actually shows an irregular pleat-like structure.

The terms of "exhibits a structure that the fiber layer B is irregularly lifted up" or "exhibits an irregular pleat-like structure" mean that the structure does not have regularity, such as the convex parts formed by heat-shrinking after partly thermo-compression binding the non-shrinkable fiber web and the shrinkable monocomponent fiber web by an emboss roll (having a regular engraved pattern), as described in Patent Literature 1. Moreover, the term means to have a structure having at least an irregular repeating pattern at the interval between lifted up parts or pleats and refers to the fact that the MD and CD intervals between adjacent lifted up parts or pleats and the MD and CD sizes of individual lifted up parts or pleats are diversified.

The number of pleats in the pleat-like structure of the fiber layer B is preferably eight or more per 50 mm. It is difficult to observe the pleat-like structure unless the fiber layer A and the fiber layer B are peeled off. In the case where the fiber layer A and the fiber layer B are peeled off, they may be peeled off by hand. In the case where the entanglement and bonding between the layers are strong, they may be peeled off by peeling them by hand while cutting the fibers using a cutting tool such as a cutter. The number of the pleats can be measured by applying a scale onto the peeled surface of fiber layer A side of the fiber layer B and counting the number of tops of the pleats-like structure at the MD interval of 50 mm.

In the case where the fiber constituting a web before the transformation into the fiber layer B is arranged in the MD and is relatively rigid toward the deformation (shrinking) in the MD of the web, the pleat-like structure can be clearly observed. To the contrary, in the case where the fiber constituting a web before the transformation into the fiber layer B is arranged small in the MD and is relatively flexible toward the deformation (shrinking) in MD of the web, the pleat-like structure becomes unclear. The reason why the pleat-like structure becomes unclear is that a large number of the lifted up parts are exhibited randomly, namely in a directionless manner.

Unlike the nonwoven fabric by the carding method, since in the fiber layer B, the fiber is arranged in the thickness direction of the nonwoven fabric by the lifted up structure, the nonwoven fabric is excellent in bulkiness and cushioning properties, has a good texture, and has a characteristic feature that the properties can be kept even when shaping is performed at post-processing.

[Specific Volume]

The specific volume of the bulky nonwoven fabric of the invention is 30 cm$^3$/g or more, preferably 34 cm$^3$/g or more. By controlling the specific volume to 30 cm$^3$/g or more, the bulkiness and cushioning properties become excellent and the texture becomes good. On the other hand, when the specific volume is less than 30 cm$^3$/g, the bulkiness and cushioning properties decrease and the texture becomes worse.

The specific volume of the bulky nonwoven fabric of the invention can be controlled by adjusting the shrinking ratio of the web to be used as the fiber layer A and the shrinking ratio of the web to be used as the fiber layer B to specific ranges and controlling heating conditions, as mentioned below.

[Unit Weight]

The unit weight of the bulky nonwoven fabric of the invention is preferably 24 to 120 g/m$^2$, more preferably 30 to 100 g/m$^2$. By controlling the unit weight to the range, the bulky nonwoven fabric can be made relatively inexpensive and thus becomes suitable for utilization in filter applications such as ventilation fan filters, oil catchers, air filters, oil filters, and electret filters, cleaning sheet applications for floor mops, female material applications of disposable Hook- and Loop fasteners, hygienic material applications such as surface materials for paper diapers and sanitary napkins.

As a examples of the method for producing the bulky nonwoven fabric of the invention, the following methods can be listed. A shrinkable web containing a latent spirally crimpable fiber obtained by the carding method as a lower layer is laminated to a non-shrinkable web obtained by the carding method as an upper layer to form a laminate. By heating the laminate, the shrinking of the lower layer and the formation of the nonwoven fabric are simultaneously carried out to produce the bulky nonwoven fabric.

The lower layer and the upper layer of the bulky nonwoven fabric thus obtained are the fiber layer A and the fiber layer B, respectively. By forming the fiber layer A as a lower layer and the fiber layer B as an upper layer, the whole fiber layer B can follow the shrinkage of the fiber layer A at the production of the bulky nonwoven fabric, and thus a nonwoven fabric having a sufficient bulkiness can be obtained.

In the specification, the "shrinkable web" is a web having a shrinking ratio of 50% or more at the time when the web is heated at 145° C. for 5 minutes. Moreover, the "non-shrinkable web" is a web having a shrinking ratio of 15% or less at the time when the web is heated at 145° C. for 5 minutes. The shrinking ratio of the web is measured by the method of Example to be mentioned later.

The difference in shrinking ratio between the shrinkable web to be used in the fiber layer A and the non-shrinkable web to be used in the fiber layer B is preferably 50% or more, further preferably 60% or more. By controlling the difference in shrinkage ratio to 50% or more, a bulky nonwoven fabric having a sufficient bulkiness can be obtained.

Examples of the heating means include a pin-tenter type drier, a shrink drier to be used for drying towels and plain cloths, a floating drier, a drum type drier, a conveyer type drier, and a convection drier (oven). It is not particularly limited but a conveyer type drier which is widely used for card-method nonwoven fabrics can be preferably used. For the heating method, heated air is generally used but steam, infrared rays, microwaves, and heat roll contact may be used.

With regard to the heating temperature, the heating of a laminate of the shrinkable web to be used for the fiber layer A as the lower layer and the non-shrinkable web to be used for the fiber layer B as the upper layer is preferably performed at a temperature that the latent spirally crimpable fiber contained in the shrinkable web to be used for the fiber layer A exhibits spiral crimps or higher; and that the low-melting component contained in the non-shrinkable web to be used for the fiber layer B causes self adhesion. Moreover, when heated air is used as a heating method, the heating time is preferably usually 3 to 10 seconds and air velocity is preferably usually 0.8 to 1.4 in/second.

[Shaping Pattern Mold]

In the bulky nonwoven fabric of the invention, the fiber layer B is bulky, since the fiber is arranged in the thickness direction of the nonwoven fabric, unlike the nonwoven fabric obtained by the conventional carding method. Due to such a characteristic feature, the bulky nonwoven fabric of the invention is excellent in shaping ability when a mold engraved with a shaping pattern is pressed against the nonwoven fabric from the fiber layer B side, and the shaping pattern can be clearly embossed as compared with the nonwoven fabric obtained by the conventional carding method. Therefore, designing properties of the bulky nonwoven fabric of the invention can be further enhanced.

Therefore, one of preferred embodiments of the bulky nonwoven fabric of the invention is a bulky nonwoven fabric against which a mold engraved with a shaping pattern is pressed from the fiber layer B side to provide the shaping pattern. The bulky nonwoven fabric against which a mold engraved with a shaping pattern is pressed from the fiber layer B side to provide the shaping pattern can be produced by such as the following method.

A shrinkable web containing a latent spirally crimpable fiber obtained by the carding method as a lower layer is laminated to a non-shrinkable web obtained by the carding method as an upper layer to form a laminate. By heating the laminate, the shrinking of the lower layer and the formation of the nonwoven fabric are simultaneously carried out. Thereafter, before the bulky nonwoven fabric is not sufficiently cooled, a mold engraved with a shaping pattern, e.g., a roll-like article is applied thereto with pressure. The mold may be heated and it is preferred to heat it to a temperature equal to or lower than the melting point of the highest melting point among the low-melting components of the fiber to be used.

As above, since the bulky nonwoven fabric of the invention against which a mold engraved with a shaping pattern is pressed to provide the shaping pattern can be produced using minimum facilities and also is excellent in designing properties, the nonwoven fabric is preferable.

[Emboss Roll]

One of preferred embodiments of the bulky nonwoven fabric of the invention is a bulky nonwoven fabric against which a hot emboss roll is pressed from the fiber layer B side to effect press-fusion. The bulky nonwoven fabric is particularly excellent in designing properties and thus is preferred.

The pressing with the hot emboss roll is carried out after the bulky nonwoven fabric is obtained by heating the laminate of a shrinkable web containing a latent spirally crimpable fiber obtained by the carding method as a lower layer and a non-shrinkable web obtained by the carding method as an upper layer. In view of capability of selecting the engraved pattern depending on applications, the nonwoven fabric is relatively inexpensive. The pressing with the hot emboss roll may be in-line or off-line.

The phrase "a hot emboss roll is pressed from the fiber layer B side" means that the bulky nonwoven fabric is inserted between one pair of an engraved roll and a flat roll or one pair of an engraved roll and an engraved roll having the same phase pattern as the pattern of the former engraved roll with the condition that the fiber layer B side is set as the engraved roll side; and thermal press-fusion is performed. From the economical viewpoint, the emboss roll is preferably heated and pressurized one pair of the engraved roll and the flat roll.

The heating temperature and pressure of the emboss roll are set in consideration of the processing rate and bulkiness of the nonwoven fabric after processing. The range of the temperature of the heating emboss roll is preferably with in the ±30° C. range based on the melting point of any one of low-melting components of the fiber contained in either the fiber layer A or the fiber layer B. By controlling the temperature to the temperature range, the bulkiness after shaping by the emboss roll can be minimized. Moreover, the pressure of the emboss roll is preferably in the range of 20 to 100 N/mm.

In the bulky nonwoven fabric subjected to pressing with the heating emboss roll from the fiber layer B side and press-fused, one fused region formed by press-fusion is preferably 0.1 mm$^2$ or more to 4.0 mm$^2$ or less, more preferably 0.15 mm$^2$ or more to 3.5 mm$^2$ or less. By controlling the area of the fused region to 0.1 mm$^2$ or more, the pattern molded by the emboss roll can be visually observed clearly. Moreover, by controlling the area of the fused region to 4.0 mm$^2$ or less, the pattern can be prevented from becoming too rough.

The shortest distance between a fused region and an adjacent fused region is preferably 2.0 mm or more. By controlling the shortest distance between a fused region and an adjacent fused region to 2.0 mm or more, a pattern can be prevented from being unclearly formed due to a decrease in bulkiness of the nonwoven fabric present between the fused regions. In addition, when the shortest distance between the fused regions is less than 2.0 mm, it is preferred that the bulkiness itself of the bulky nonwoven fabric also can be prevented. The depth of the engraving is preferably 0.5 mm or more, although it depends on the thickness of the bulky nonwoven fabric to be processed.

The area percentage of the fused regions to the area of the whole nonwoven fabric is preferably 2% or more to 25% or less, more preferably 6% or more to 15% or less. By controlling the area percentage of the fused regions to 2% or more, the pattern is prevented from becoming rough and a clearly observable pattern can be molded. Moreover, by controlling the area percentage of the fused regions to 25% or less, a decrease in bulkiness of the nonwoven fabric in the fused regions can be prevented.

[Ultrasonic Embossing]

One of the preferred embodiment is a bulky nonwoven fabric obtained by carrying out the ultrasonic embossing treatment to a bulky nonwoven fabric obtained by integration due to shrinkage of the fiber layer, from the fiber layer B side. A nonwoven fabric obtained using this method has a soft surface, especially the surface of the fiber layer B and is excellent in texture, since heat fusion of the parts without ultrasonic treatment can be completely prevented. In addition, since the treatment method is not affected by the limitation relating to thickness of a nonwoven fabric, the method is preferably used for the purpose of embossing of especially, a bulky nonwoven fabric.

[Applications]

Since the bulky nonwoven fabric of the invention has a characteristic feature that it can be produced at relatively low costs, it can be suitably used as a member of constituting so-called disposable articles. Particularly, it can be widely suitably utilized in filter applications such as ventilation fan filters and oil catchers, cleaning sheet applications for floor mops, female material applications of Hook- and Loop fasteners of disposable articles, hygienic material applications such as surface materials for paper diapers and sanitary napkins, and the like.

EXAMPLES

The following will describe the invention in further detail with reference to Examples but the scope of the invention is not limited thereto.

[Evaluation Method]

Evaluation of Examples and Comparative Examples were performed as follows.

(1) Unit Weight

Weight of a nonwoven fabric cut into 15 cm square was measured using HF-200 manufactured by A & D Company and the weight was converted into weight (g) per square meter (g/m$^2$) and, the resultant value was regarded as unit weight.

(2) Thickness

To a nonwoven fabric cut into 15 cm square, a pressure of 3.5 g/cm$^2$ was imparted through a pressurizer having a diameter of 35 mm, and the thickness at that time was measured using a DEGI-THICKNESS TESTER manufactured by Toyo Seiki Seisaku-sho, Ltd.

(3) Shrinking Ratio

The shrinking ratio of a web was measured as follows. Using a miniature carding machine manufactured by Daiwa-Kiko Co., Ltd., 100 g of an opened raw stock to be used was introduced at the point of 30 cm from a central part of an feeding conveyer of the carding machine, wound up entirely at a doffer speed of 7.0±0.2 m/minute and at a winding drum (peripheral length: 145 cm) speed of 7.3±0.2 m/minute, and cut with scissors, thereby collecting a web of 25 cm square. The web of about 25 cm square was sandwiched between two sheets of kraft paper and treated in a convection drier manufactured by Sanyo Electric Co., Ltd. set at 145° C. for 5 minutes. Then, the web was taken out and the MD (Machine Direction) length was measured, and the shrinking ratio was calculated according to the following formula.

Shrinking ratio=((length before thermal treatment [cm])−(length after thermal treatment [cm]))/ (length before thermal treatment [cm])×100(%)

(4) Real Fiber Length

Using a digital microscope manufactured by Keyence Corporation, the real fiber length was determined by measuring length of one fiber from one end to another end along the fiber using its image-analyzing function (an average value on any five pieces of the fiber was regarded as a measured value).

Example 1

(Preparation of Web A)

As a latent crimpable heat-fusible conjugate fiber, a latent crimpable heat-fusible conjugate fiber comprising an ethylene-propylene-butene-1 random copolymer and polypropylene and having a side-by-side type cross-section, a fineness of 8.8 dtex, and a real fiber length of 64 mm was used. The conjugate ratio (on the basis of weight) of the ethylene-propylene-butene-1 random copolymer to polypropylene was 49/51. The latent crimpable heat-fusible conjugate fiber was charged into a miniature carding machine manufactured by Daiwa-Kiko Co., Ltd. to collect a web A having a unit weight of 10 g/m$^2$. As a result of measurement by the above-described measuring method, the web shrinking ratio of the resulting web A was 72%.

(Preparation of Web B)

As a heat-fusible conjugate fiber, a heat-fusible conjugate fiber comprising high-density polyethylene and polypropylene and having a sheath-core type cross-section, a fineness of 2.2 dtex, and a real fiber length of 38 mm was used. The conjugate ratio (on the basis of weight) of high-density polyethylene to polypropylene was 52/48. The heat-fusible conjugate fiber was charged into a miniature carding machine manufactured by Daiwa-Kiko Co., Ltd. to collect a web B having a unit weight of 10 g/m$^2$. As a result of measurement by the above-described measuring method, the web shrinking ratio of the resulting web B was 0%.

(Preparation of Bulky Nonwoven Fabric)

After lamination of the above web A as a lower layer and the above web B as an upper layer, the laminate was inserted into a conveyer type drier (manufactured by Kotobuki industries Co., Ltd.) where hot air at 135° C. passed from top to bottom at a rate of 1.1 m/second to achieve development of crimping of the latent crimpable heat-fusible conjugate fiber constituting the web A and also shrinking thereof, thereby obtaining a bulky nonwoven fabric wherein the fibers of both layers are integrated by partial entanglement at the contact surface in the direction of thickness of both layers and the fiber layer B is lifted up between the entangled parts of the fiber layer A and the fiber layer B.

Example 2

A bulky nonwoven fabric was formed in the same manner as in Example 1 using fibers shown in Table 1 as a lower layer to be a fiber layer A and as an upper layer to be a fiber layer B, respectively.

Example 3

A bulky nonwoven fabric was formed in the same manner as in Example 1 using fibers shown in Table 1 as a lower layer to be a fiber layer A and as an upper layer to be a fiber layer B, respectively.

Example 4

A bulky nonwoven fabric was formed in the same manner as in Example 1 using fibers shown in Table 1 as a lower layer to be a fiber layer A and as an upper layer to be a fiber layer B, respectively.

Example 5

A bulky nonwoven fabric was formed in the same manner as in Example 1 using fibers shown in Table 1 as a lower layer to be a fiber layer A and as an upper layer to be a fiber layer B, respectively.

Example 6

A bulky nonwoven fabric was formed in the same manner as in Example 1 using fibers shown in Table 1 as a lower layer to be a fiber layer A and as an upper layer to be a fiber layer B, respectively. An Oven was used as a heating method, a convection drier manufactured by Sanyo Electric Co., Ltd. was used, and the heating time was set at 5 minutes.

Example 7

A bulky nonwoven fabric formed in the same manner as in Example 1 using fibers shown in Table 1 as a lower layer to be a fiber layer A and as an upper layer to be a fiber layer B, respectively, was subjected to emboss processing. As an engraved roll for the emboss processing, a roll having a round protrusion having a diameter of 0.8 mm arranged thereon in a zigzag form at a width of 5.0 mm and a length of 2.5 mm was used. The heating temperature was set at 124° C. and the line pressure was set at 20 kg/cm.

Example 8

A bulky nonwoven fabric was formed in the same manner as in Example 1 using fibers shown in Table 1 as a lower layer to be a fiber layer A and as an upper layer to be a fiber layer B, respectively. Immediately after the bulky nonwoven fabric was discharged from the thermal treatment machine, it was subjected to shaping processing. For a shaping processing, a roll made of a punching plate having a round concave portion having a diameter of 3.0 mm arranged on the surface in a zigzag form (chidori arrangement) at a width of 5.0 mm and a length of 2.5 mm was used. The line pressure was 5 kg/cm. The area percentage of the concave portion was 56.5%.

Comparative Example 1

(Preparation of Web A)

As a heat-fusible conjugate fiber, a heat-fusible conjugate fiber comprising an ethylene-propylene-butene-1 random copolymer and polypropylene and having a side-by-side type cross-section, a fineness of 8.8 dtex, and a real fiber length of 64 mm was used. The conjugate ratio (on the basis of weight) of the ethylene-propylene-butene-1 random copolymer to polypropylene was 49/51. The heat-fusible conjugate fiber was charged into a miniature carding machine manufactured by Daiwa-Kiko Co., Ltd. to collect a web A having a unit weight of 20 g/m$^2$. As a result of measurement by the above-described measuring method, the web shrinking ratio of the resulting web A was 3%.

(Preparation of Web B)

As a heat-fusible conjugate fiber, a heat-fusible conjugate fiber which comprising high-density polyethylene and polypropylene and having a sheath-core type cross-section, a fineness of 2.2 dtex, and a real fiber length of 38 mm was used. The conjugate ratio (on the basis of weight) of the high-density polyethylene to polypropylene was 52/48. The heat-fusible conjugate fiber was charged into a miniature carding machine manufactured by Daiwa-Kiko Co., Ltd. to collect a web B having a unit weight of 18 g/m$^2$. As a result of the measurement by the above-described measuring method, the web shrinking ratio of the resulting web B was 2%.

(Preparation of Bulky Nonwoven Fabric)

After lamination of the above web A as a lower layer and the above web B as an upper layer, the laminate was inserted into a conveyer type drier (manufactured by Kotobuki industries Co., Ltd.) where hot air at 135° C. passed from top to bottom at a rate of 1.1 m/second, thereby obtaining a nonwoven fabric wherein the web A formed a fiber layer A and the web B formed a fiber layer B.

Comparative Example 2

A nonwoven fabric was formed in the same manner as in Comparative Example 1 using fibers shown in Table 1 as a lower layer and as an upper layer, respectively.

Comparative Example 3

A nonwoven fabric was formed in the same manner as in Comparative Example 1 using fibers shown in Table 1 as a lower layer and as an upper layer, respectively.

Comparative Example 4

A nonwoven fabric was formed in the same manner as in Comparative Example 1 using fibers shown in Table 1 as a lower layer and as an upper layer, respectively.

Table 1 shows the processing conditions and the results of evaluation of the nonwoven fabrics of Examples 1 to 8 and Comparative Examples 1 to 4.

TABLE 1

| | | | Example | | | | | | | |
|---|---|---|---|---|---|---|---|---|---|---|
| | | | 1 | 2 | 3 | 4 | 5 | 6 | 7 | 8 |
| Lower layer | Fiber 1 | Fineness (dtex) × real fiber length (mm) | 8.8 × 64 | 17.6 × 128 | 2.2 × 38 | 1.7 × 30 | 4.4 × 45 | 4.4 × 38 | 8.8 × 64 | 8.8 × 64 |
| | | Resin species (S/C or S/S) | EBP/PP | PLA/PET | EP/PP | PP/EBP | EBP/PP | LDPE/PP | EBP/PP | EBP/PP |
| | | Fiber cross-section | S/S | S/S | eccentric S/C | eccentric S/C | S/S | S/S | S/S | S/S |
| | | Mixing ratio (mass %) | 100 | 50 | 100 | 80 | 100 | 100 | 100 | 100 |
| | Fiber 2 | Fineness (dtex) × real fiber length (mm) | — | 3.3 × 45 | — | 1.7 × 42 | — | — | — | — |

TABLE 1-continued

|  |  |  |  |  |  |  |  |  |  |  |
|---|---|---|---|---|---|---|---|---|---|---|
|  |  | Resin species (S/C or S/S) | — | EBP/PP | — | rayon | — | — | — | — |
|  |  | Fiber cross-section | — | eccentric S/C | — | — | — | — | — | — |
|  |  | Mixing ratio (mass %) | — | 50 | — | 20 | — | — | — | — |
|  |  | Web unit weight (g/m²) | 10 | 15 | 20 | 20 | 10 | 20 | 10 | 10 |
|  |  | Web shrinking ratio (%) | 72 | 80 | 65 | 64 | 73 | 70 | 72 | 60 |
| Upper layer | Fiber 3 | Fineness (dtex) × real fiber length (mm) | 2.2 × 38 | 3.3 × 45 | 1.7 × 30 | 2.2 × 45 | 2.2 × 38 | 2.2 × 38 | 2.2 × 38 | 2.2 × 38 |
|  |  | Resin species (S/C or S/S) | HDPE/PP | HDPE/PET | HDPE/PP | LLDPE/PP | HDPE/PP | HDPE/PP | HDPE/PP | HDPE/PP |
|  |  | Fiber cross-section | S/C | S/C | eccentric S/C | eccentric S/C | S/C | S/C | S/C | S/C |
|  |  | Mixing ratio (mass %) | 100 | 70 | 100 | 100 | 100 | 100 | 100 | 100 |
|  | Fiber 4 | Fineness (dtex) × real fiber length (mm) | — | 6.7 × 102 | — | — | — | — | — | — |
|  |  | Resin species (S/C or S/S) | — | S/C | — | — | — | — | — | — |
|  |  | Fiber cross-section | — | HDPE/PP | — | — | — | — | — | — |
|  |  | Mixing ratio (mass %) | — | 30 | — | — | — | — | — | — |
|  |  | Web unit weight (g/m²) | 10 | 15 | 10 | 20 | 10 | 20 | 10 | 10 |
|  |  | Web shrinking ratio (%) | 0 | 0 | 8 | 6 | 2 | 2 | 2 | 2 |

|  | Example | | | | | | | |
|---|---|---|---|---|---|---|---|---|
|  | 1 | 2 | 3 | 4 | 5 | 6 | 7 | 8 |
| Heating method | conveyer type drier | conveyer type drier | conveyer type drier | conveyer type drier | conveyer type drier | oven | conveyer type drier | conveyer type drier |
| Heating temperature (° C.) | 135 | 140 | 138 | 128 | 139 | 136 | 135 | 135 |
| Post Shaping method | — | — | — | — | — | — | emboss | shaping roll |
| Unit weight of nonwoven fabric (g/m²) | 38 | 73 | 48 | 96 | 47 | 94 | 38 | 38 |
| Thickness of nonwoven fabric (mm) | 1.8 | 2.5 | 2.0 | 3.3 | 1.9 | 3.6 | 1.6 | 1.2 |
| Specific volume (cm³/g) | 47 | 34 | 42 | 34 | 40 | 38 | 42 | 32 |

|  |  |  | Comparative Example | | | |
|---|---|---|---|---|---|---|
|  |  |  | 1 | 2 | 3 | 4 |
| Lower layer | Fiber 1 | Fineness (dtex) × real fiber length (mm) | 8.8 × 64 | 2.2 × 38 | 4.4 × 45 | 8.8 × 64 |
|  |  | Resin species (S/C or S/S) | EBP/PP | EP/PP | EBP/PP | EBP/PP |
|  |  | Fiber cross-section | S/C | S/C | S/C | S/C |
|  |  | Mixing ratio (mass %) | 100 | 100 | 100 | 100 |
|  | Fiber 2 | Fineness (dtex) × real fiber length (mm) | — | — | — | — |
|  |  | Resin species (S/C or S/S) | — | — | — | — |
|  |  | Fiber cross-section | — | — | — | — |
|  |  | Mixing ratio (mass %) | — | — | — | — |
|  |  | Web unit weight (g/m²) | 20 | 33 | 23 | 20 |
|  |  | Web shrinking ratio (%) | 3 | 4 | 0 | 0 |
| Upper layer | Fiber 3 | Fineness (dtex) × real fiber length (mm) | 2.2 × 38 | 1.7 × 30 | 2.2 × 38 | 2.2 × 38 |
|  |  | Resin species (S/C or S/S) | HDPE/PP | HDPE/PP | HDPE/PP | HDPE/PP |
|  |  | Fiber cross-section | S/C | eccentric S/C | S/C | S/C |
|  |  | Mixing ratio (mass %) | 100 | 100 | 100 | 100 |
|  | Fiber 4 | Fineness (dtex) × real fiber length (mm) | — | — | — | — |
|  |  | Resin species (S/C or S/S) | — | — | — | — |
|  |  | Fiber cross-section | — | — | — | — |
|  |  | Mixing ratio (mass %) | — | — | — | — |
|  |  | Web unit weight (g/m²) | 18 | 16 | 23 | 18 |
|  |  | Web shrinking ratio (%) | 2 | 4 | 0 | 0 |
| Heating method |  |  | conveyer type drier | conveyer type drier | conveyer type drier | conveyer type drier |
| Heating temperature (° C.) |  |  | 135 | 138 | 139 | 135 |
| Post Shaping method |  |  | — | — | — | shaping roll |

TABLE 1-continued

| | | | | |
|---|---|---|---|---|
| Unit weight of nonwoven fabric (g/m²) | 38 | 49 | 46 | 38 |
| Thickness of nonwoven fabric (mm) | 1.4 | 1.6 | 1.6 | 0.9 |
| Specific volume (cm³/g) | 37 | 33 | 35 | 24 |

EBP = ethylene-propylene-butene-1 random copolymer
PP = polypropylene
HDPE = high-density polyethylene
PLA = polylactic acid
PET = polyethylene terephthalate
EP = ethylene-propylene random copolymer
LLDPE = linear low-density polyethylene
LDPE = low-density polyethylene
S/S = side-by-side
S/C = sheath-core From the results shown in Table 1, the following were found.

Example 1

Even when the unit weight was the same, as shown in Table 1, the bulky nonwoven fabric of Example 1 was larger in thickness and thus was more excellent in bulkiness than the nonwoven fabric of Comparative Example 1. Moreover, when the bulky nonwoven fabric was held by five monitor person from the fiber layer B side and sensory comparison thereof with the nonwoven fabric of Comparative Example 1 was performed about pleasant feel and cushioning properties as keywords, all the five monitor persons replied that the nonwoven fabric of Example 1 was excellent more than one can expect from the difference in thickness.

Example 2

As shown in Table 1, from the results of Example 2, it was found that a bulky nonwoven fabric could be similarly produced even when a polyester-based latent crimpable heat-fusible conjugate fiber was used.

Example 3

Even when the unit weight was the same, as shown in Table 1, the bulky nonwoven fabric of the Example 3 was larger in thickness and thus was more excellent in bulkiness than the nonwoven fabric of Comparative Example 2. Moreover, the bulky nonwoven fabric was held by five monitor person from the fiber layer B side wherein sensory comparison of the nonwoven fabric between Example 3 and Comparative Example 2 was performed about hand feeling of both nonwoven fabrics using pleasant feel and cushioning properties as keywords. As the results, all the five monitor persons replied that the nonwoven fabric of Example 3 was excellent more than those one can expect from the difference in thickness.

Example 4

As shown in Table 1, from the results of Example 4, it was found that a bulky nonwoven fabric could be similarly produced even when rayon was used as a blend component for a latent crimpable conjugate fiber of the fiber layer A and linear low-density polyethylene was used as a sheath component of the fiber layer B.

Example 5

Even when the unit weight was the same, as shown in Table 1, the bulky nonwoven fabric of the Example 5 was larger in thickness e and thus was more excellent in bulkiness than the nonwoven fabric of Comparative Example 3. Moreover, the bulky nonwoven fabric was held by five monitor person from the fiber layer B side wherein sensory comparison of the nonwoven fabric between between Example 5 and Comparative Example 3 was performed about hand feeling of both nonwoven fabrics using pleasant feel and cushioning properties as keywords. As the results, all the five monitor persons replied that the nonwoven fabric of Example 5 was excellent more than those one can expect from the difference in thickness.

Example 6

As shown in Table 1, from the results of Example 6, it was found that a bulky nonwoven fabric could be similarly produced even when linear low-density polyethylene was used as sheath component for a latent crimpable conjugate fiber of the fiber layer A and even when an oven was used as a heating method.

Example 7

As shown in Table 1, though the nonwoven fabric of Example 7 was obtained by emboss processing of the nonwoven fabric of Example 1, a decrease in thickness is small and emboss pattern was clearly and deeply imparted, so that the nonwoven fabric of Example 7 was excellent in designing properties.

Example 8

As shown in Table 1, though the nonwoven fabric of Example 8 was obtained by emboss processing of the nonwoven fabric of Example 1, a decrease in thickness is small and emboss pattern was clearly and deeply imparted, so that the nonwoven fabric of Example 8 was excellent in designing properties. Moreover, the nonwoven fabric had a large thickness even when the unit weight was the same and thus was excellent in bulkiness, as compared with the nonwoven fabric of Comparative Example 4. Furthermore, when the bulky nonwoven fabric was held by five monitor person from the fiber layer B side and sensory comparison thereof with the nonwoven fabric of Comparative Example 4 was performed about hand feeling of both nonwoven fabrics using pleasant feel and cushioning properties as keywords, all the five monitor persons replied that the nonwoven fabric of Example 8 was excellent more than one can expect from the difference in thickness.

While the invention has been described in detail and with reference to specific embodiments thereof, it will be apparent to one skill in the art that various changes and modifications can be made therein without departing from the spirit and scope thereof.

This application is based on Japanese application No. 2010-092576, filed on Apr. 13, 2010, and Japanese application No. 2011-062498, filed on Mar. 22, 2011, the entire contents of which are incorporated hereinto by reference. All references cited herein are incorporated in their entirety.

What is claimed is:

1. A bulky nonwoven fabric, comprising:
   a fiber layer A comprising a spiral crimp fiber and at least one surface, and
   a fiber layer B comprising a fiber, wherein the fiber layer B is laminated on the surface of the fiber layer A,
   wherein the spiral crimp fiber of the fiber layer A and the fiber of the fiber layer B are partly entangled and integrated at an interface in a thickness direction of both layers, and the fiber layer B exhibits a pleat structure in which the layer is lifted up to the fiber layer B side between individual entangled parts; and
   wherein the bulky nonwoven fabric has a specific volume of 30 cm$^3$/g or more and a unit weight of from 30 to 100 g/m$^2$.

2. The bulky nonwoven fabric according to claim 1, wherein the spiral crimp fiber contained in the fiber layer A is a fiber obtained by allowing a latent crimpable fiber to exhibit a spiral crimp and, at the time of generating the spiral crimp of the latent crimpable fiber, the spiral crimp fiber of the fiber layer A and the fiber of the fiber layer B are entangled and integrated at the interface of both fiber layers.

3. The bulky nonwoven fabric according to claim 1, wherein the fiber layer A further comprises a latent crimpable heat-fusible conjugate fiber, and entangled points at the entangled parts of the spiral crimped fiber of the fiber layer A and the fiber of the fiber layer B are bonded to each other by at least heat-fusion of the latent crimpable heat-fusible conjugate fiber.

4. The bulky nonwoven fabric according to claim 1, wherein the fiber layer B is pressed with a mold on which a shaping pattern is engraved.

5. The bulky nonwoven fabric according to claim 1, wherein the fiber layer B is pressed with a hot emboss roll to be press-fused.

6. The bulky nonwoven fabric according to claim 5, wherein one fused region press-fused has an area of 0.1 mm$^2$ to 4.0 mm$^2$; the fused region and an adjacent fused region have the shortest distance of 2.0 mm or more; and the fused regions have an area percentage of 2% to 25% to the area of the whole nonwoven fabric.

7. The bulky nonwoven fabric according to claim 1, wherein the spiral crimp fiber contained in the fiber layer A is a conjugate fiber having a side-by-side type and/or eccentric sheath-core type cross-section which is composed of an ethylene-propylene random copolymer and/or an ethylene-propylene-butene-1 random copolymer and polypropylene.

8. The bulky nonwoven fabric according to claim 7, wherein the random copolymer and the polypropylene are contained in a conjugate ratio of in the range of 30/70 to 70/30 on the basis of weight.

9. The bulky nonwoven fabric according to claim 1, wherein the fiber in the fiber layer B is a heat-fusible conjugate fiber comprising two components, and has at least one cross-section structure selected from the group consisting of a sheath-core type, an eccentric sheath-core type and a side-by-side type.

10. The bulky nonwoven fabric according to claim 9, wherein the two components are contained in a conjugate ratio of 30/70 to 70/30 on the basis of weight.

11. The bulky nonwoven fabric according to claim 1, wherein the fiber layer A has a fiber fineness of 1.5 dtex to 17.6 dtex and a fiber length of 30 mm to 128 mm.

12. The bulky nonwoven fabric according to claim 1, wherein the fiber layer B has a fiber fineness of 1.5 dtex to 6.7 dtex and a fiber length of 30 mm to 102 mm.

13. A product comprising the bulky nonwoven fabric according to claim 1.

14. A process for producing the bulky nonwoven fabric according to claim 1, comprising:
   laminating, on at least one surface of a fiber layer A comprising a latent crimpable fiber, a fiber layer B which is spirally crimped weaker than the fiber layer A or is not spirally crimped at a temperature that the fiber layer A is spirally crimped, to obtain a laminate;
   subjecting the laminate to a thermal treatment to partly entangle the spirally crimped fiber of the fiber layer A and the fiber of the fiber layer B and to form entangled parts at an interface in a thickness direction of both layers and lifting up the fiber layer B to fiber layer B side between individual entangled parts, to obtain the bulky nonwoven fabric.

15. The process according to claim 14, wherein the latent crimpable fiber contained in the fiber layer A is a latent crimpable conjugate fiber and, upon the subjecting of the spiral crimp of the latent crimpable fiber to the thermal treatment, the spiral crimp fiber of the fiber layer A and the fiber of the fiber layer B are partly entangled at the interface in the thickness direction of both layers and integrated.

16. The process according to claim 15, wherein the latent crimpable conjugate fiber contained in the fiber layer A is a latent crimpable heat-fusible conjugate fiber and the entangled points at the entangled parts of the spiral crimp fiber of the fiber layer A and the fiber of the fiber layer B are bonded to each other by at least heat-fusion of the latent crimpable heat-fusible conjugate fiber.

17. The bulky nonwoven fabric according to claim 1, wherein the pleat structure of the fiber layer B comprises eight or more pleats per 50 mm.

* * * * *